United States Patent
Thompson

(10) Patent No.: US 7,992,262 B2
(45) Date of Patent: Aug. 9, 2011

(54) FLUSH CLEAT

(76) Inventor: David M. Thompson, Bricktown, NJ (US)

( * ) Notice: Subject to any disclaimer, the term of this patent is extended or adjusted under 35 U.S.C. 154(b) by 626 days.

(21) Appl. No.: 12/151,496

(22) Filed: May 7, 2008

(65) Prior Publication Data

US 2009/0276981 A1 Nov. 12, 2009

(51) Int. Cl.
*F16G 11/00* (2006.01)
(52) U.S. Cl. ... 24/115 R; 24/115 K; 24/128; 24/265 CD
(58) Field of Classification Search ............... 24/115 R, 24/128, 129 R, 265 CD, 115 K; 114/218; 410/101, 106, 109, 112–114; 248/499
See application file for complete search history.

(56) References Cited

U.S. PATENT DOCUMENTS

| | | | | |
|---|---|---|---|---|
| 2,605,721 A | * | 8/1952 | Johnson et al. | 410/112 |
| 3,125,036 A | * | 3/1964 | Reynolds | 410/114 |
| 4,114,553 A | | 9/1978 | Zidek | |
| 4,164,378 A | | 8/1979 | Linehan | |
| 4,267,615 A | * | 5/1981 | Nealy | 441/75 |
| 4,414,712 A | | 11/1983 | Beggins | |
| 4,706,345 A | | 11/1987 | Rockenfeller | |
| 4,993,123 A | | 2/1991 | Siwek | |
| 4,998,495 A | | 3/1991 | Bos | |
| 5,005,229 A | | 4/1991 | Bertoni | |
| 5,070,805 A | | 12/1991 | Plante | |
| 5,207,171 A | | 5/1993 | Westwood | |
| 5,339,498 A | | 8/1994 | Parsons | |
| 5,660,133 A | | 8/1997 | Munich | |
| 5,802,679 A | | 9/1998 | Neeley | |
| RE35,965 E | | 11/1998 | Cook | |
| 5,987,711 A | | 11/1999 | Parsons | |
| 6,012,204 A | | 1/2000 | Roethler | |
| 6,241,440 B1 | | 6/2001 | Orlebeke | |

* cited by examiner

*Primary Examiner* — James R Brittain
(74) *Attorney, Agent, or Firm* — Andrew W. Ludy

(57) ABSTRACT

A rope cleat secures a rope to a structure. The cleat has a body with opposite first and second portions joined along a longitudinal central plane. The body has a U-shaped cavity inside it tapering between a large entrance leg and a smaller exit leg, which communicate at a confluent portion. A flange is integrally attached to the body first portion. The flange is mounted against the structure through a mounting hole. The flange has an entrance hole and an exit hole spaced apart and extending through the flange. The rope is easily inserted into the large entrance hole, through the U-shaped cavity, and out the smaller exit hole. A knot is then tied to secure the rope in the cleat. The cleat has registration pins on one body portion, and corresponding registration holes on the opposite portion. The pins align the body first and second portions for assembly with a screw.

5 Claims, 3 Drawing Sheets

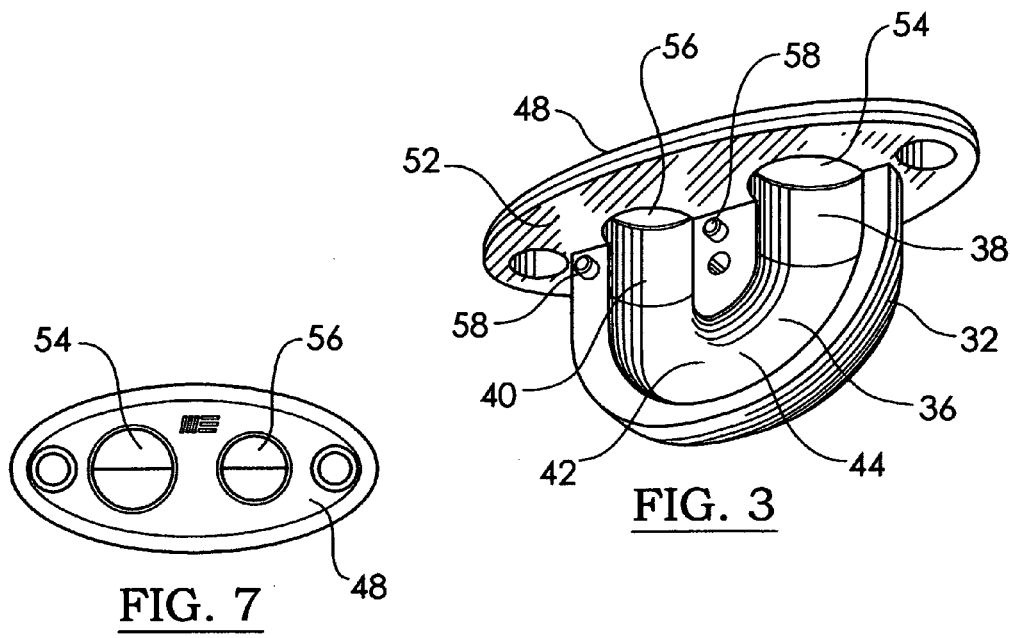

FLUSH CLEAT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention relates to the field of rope cleats, and more particularly to a cleat for securing a rope to a boat, airplane, building, dock, post, foundation, or other structure, and especially to fasten a fender to a boat.

Boat cleats have traditionally taken the shape of a structure protruding above the deck, and having two horns around which a rope is wrapped and secured with a hitch or knot. Many variations of this basic theme have been devised, with most having a structure protruding above the deck. This type of cleat can be a trip hazard for the crew. There is also the prospect of running rigging catching on the cleat at an inconvenient moment. Furthermore, novice boatmen can have difficulty securing a line to a cleat properly.

Some examples of rope cleats in the prior art are as follows:

Westwood, U.S. Pat. No. 5,207,171; discloses a block having two holes starting apart on one side of the block, and emerging together on the opposite side. The block protrudes above the deck. The rope must be pushed through one hole, grasped, and pushed back through the other hole.

Parsons, U.S. Pat. No. 5,987,711; illustrates a rope passing upward through a curved arm, across a trough, and down through another curved arm. Ridges in the trough grip the rope.

Roethler, U.S. Pat. No. 6,012,204; Parsons, U.S. Pat. No. 5,339,498; Munich, U.S. Pat. No. 5,660,133; and Cook, U.S. Pat. No. RE 35,965; each shows a block with two parallel holes. The rope must be pushed through one hole, grasped, and pushed back through the other hole. Roethler and Parsons each have a V-notch to secure the rope. Cook uses a jam cleat.

Neeley, U.S. Pat. No. 5,802,679; displays a circular jam cleat with an annular V-groove having ridges to grip the rope.

Linehan, U.S. Pat. No. 4,164,378; shows a loop braided into a rope, and fitted with a circular sheave, then encapsulated in plastic. The assembly is then inserted into a bell shaped housing, and mounted on a shackle.

Beggins, U.S. Pat. No. 4,414,712; discloses a block with two parallel holes. The rope must be pushed through one hole, grasped, and pushed back through the other hole. Side openings in the holes allow the rope to emerge, then re-enter the holes-to secure the rope.

None of the prior art devices allow for mounting flush with the deck. All protrude above deck, or are mounted on a line or stanchion. None of these inventions allow for inserting the rope into a hole only once. None allow for easy entry of the rope into the hole, yet grip the rope closely.

Accordingly, there is a need to provide a flush cleat that can be mounted flush with the structure, to preclude being a trip hazard for the crew.

There is a further need to provide a flush cleat of the type described and that allow for inserting the rope into a hole only once, then securing the rope with one simple knot.

There is a yet further need to provide a flush cleat of the type described and that will allow for easy entry of the rope into the hole, yet grip the rope closely.

There is a still further need to provide a flush cleat of the type described and that can be installed quickly and easily with hand tools by semi-skilled workers.

There is another need to provide a flush cleat of the type described and that can be manufactured cost-effectively in large quantities of high quality.

BRIEF SUMMARY OF THE INVENTION

In accordance with the present invention, there is provided a flush cleat for securing a rope to a structure. The structure has an upper surface and an oval-shaped mounting hole through the structure to receive the cleat.

The cleat comprises a body having opposite first and second portions, which are joined along a longitudinal central plane. The body has a U-shaped cavity therein with an entrance leg and an exit leg. The entrance leg and the exit leg communicate at a confluent portion. The entrance leg cross-sectional area is larger than the-exit leg cross-sectional area. Thus, the U-shaped cavity is tapered between the entrance leg and the exit leg. The U-shaped cavity has a first half lying in the body first portion, and a second half lying in the body second portion. The body is adapted for insertion into the mounting hole.

A flange is integrally attached to the body first portion. The flange can be flat or contoured, and is mounted against the structure. The flange has an entrance hole and an exit hole spaced apart and extending through the flange. The entrance hole communicates with the entrance leg. The exit hole communicates with the exit leg. The entrance hole is larger than the exit hole. The entrance and exit holes are adapted to pass the rope into the entrance hole, through the U-shaped cavity, and out the exit hole. The rope is easily inserted into the large entrance hole, yet is closely held by the smaller exit hole.

The cleat has registration pins on either the body first portion or second portion. The cleat has corresponding registration holes on the opposite portion, either the body second or first portion, respectively. The registration holes receive the registration pins, to align the body first and second portions for assembly. A screw fastens the body first and second portions together. Suitable threaded fasteners attach the flange to the structure.

In use, the rope will be inserted into the entrance hole, and will pass through the U-shaped cavity by virtue of the tapered entrance leg. The rope will emerge from the exit hole, and a knot tied to secure the rope in the cleat. The flange lies low against the structure to prevent tripping or fouling equipment.

BRIEF DESCRIPTION OF THE SEVERAL VIEWS OF THE DRAWING

A more complete understanding of the present invention may be obtained from consideration of the following description in conjunction with the drawing, in which:

FIG. 3 is a perspective view of the body first portion of the rope cleat of FIG. 1.

FIG. 4 is a front elevational view of the body first portion of the rope cleat of FIG. 1.

FIG. 5 is a right side elevational view of the body first portion of the rope cleat of FIG. 1.

FIG. 6 is a rear elevational view of the body first portion of the rope cleat of FIG. 1.

FIG. 7 is a top plan view of the body first portion of the rope cleat of FIG. 1.

FIG. 8 is a bottom plan view of the body first portion of the rope cleat of FIG. 1.

FIG. 9 is a rear, cross-sectional elevational view of the body first portion of the rope cleat of FIG. 1, taken along lines 9-9 of FIG. 5.

DETAILED DESCRIPTION OF THE INVENTION

Figure 1:
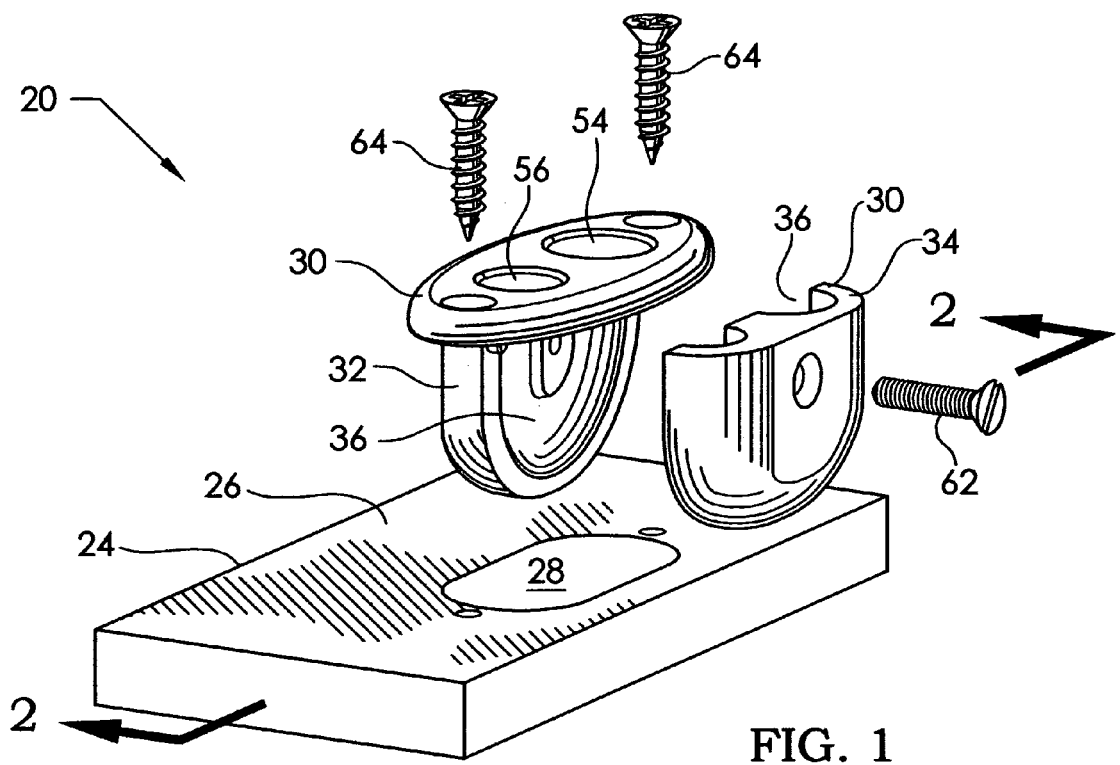
FIG. 1 is an exploded perspective assembly view of a rope cleat constructed in-accordance with the invention, and showing a portion of the structure.
Figure 2:
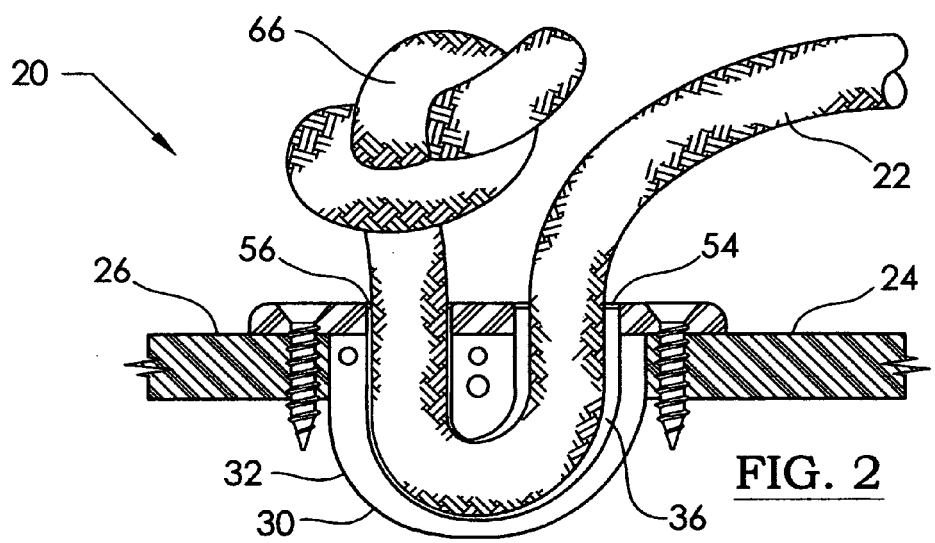
FIG. 2 is a sectional view of the rope cleat of FIG. 1, taken along lines 2-2 of FIG. 1, and showing installation of the rope cleat in the structure, and a rope inserted through the rope cleat and tied.
Figure 10:
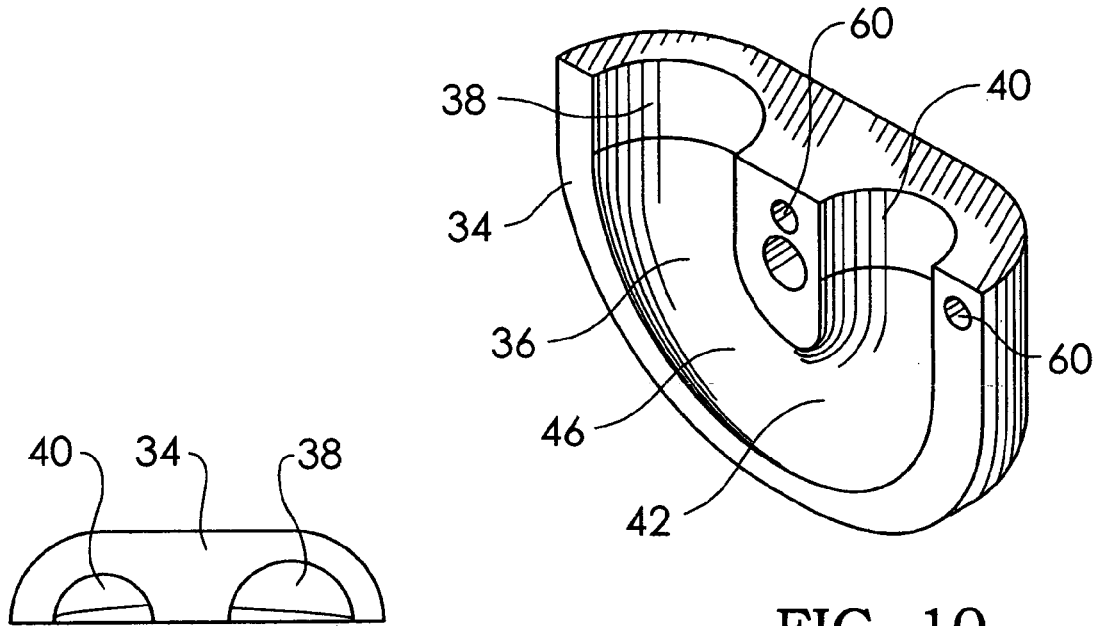
FIG. 10 is a perspective view of the body second portion of the rope cleat of FIG. 1.
Figure 14:
FIG. 14 is a top plan view of the body second portion of the rope cleat of FIG. 1.
Figure 11:
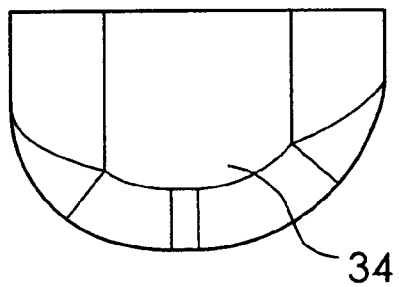
FIG. 11 is a front elevational view of the body second portion of the rope cleat of FIG. 1.
Figure 12:
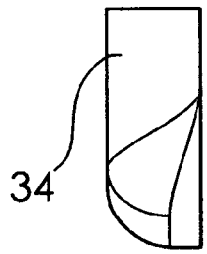
FIG. 12 is a right side elevational view of the body second portion of the rope cleat of FIG. 1.
Figure 13:
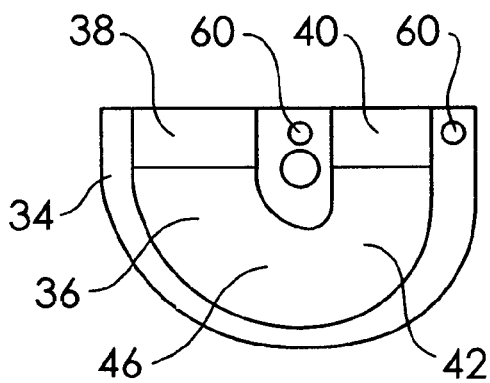
FIG. 13 is a rear elevational view of the body second portion of the rope cleat of FIG. 1.
Figure 15:
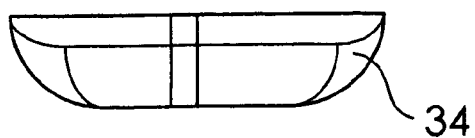
FIG. 15 is a bottom plan view of the body second portion of the rope cleat of FIG. 1.

Referring now to the drawing, a flush cleat is shown at 20, and is for use in connection with a structure 24 and a rope 22. The structure 24 has an upper surface 26 and an oval-shaped mounting hole 28 through the structure 24 to receive the cleat 20.

The cleat 20 comprises a body 30 having opposite first 32 and second 34 portions. The first 32 and second 34 portions are joined along a longitudinal central plane. The body 30 has a U-shaped cavity 36 therein with a U-shaped central axis that lies in the central plane. The U-shaped cavity 36 has an entrance leg 38 with an entrance cross-sectional area. The U-shaped cavity 36 has an exit leg 40 with an exit cross-sectional area. The U-shaped cavity 36 has a confluent portion 42 where the entrance leg 38 and the exit leg 40 communicate. The entrance leg cross-sectional area is larger than the exit leg cross-sectional area. Thus, the U-shaped cavity 36 is tapered between the entrance leg 38 and the exit leg 40. The U-shaped cavity 36 has a first half 44 lying in the body first portion 32. The U-shaped cavity 36 has a second half 46 lying in the body second portion 34. The body 30 is adapted for insertion into the mounting hole 28.

A flange 48 is attached to the body 30. The flange 48 has opposite upper 50 and lower 52 surfaces. The body first portion 32 is integral with the flange lower surface 52.

A flange 48 is attached to the body 30. The flange 48 has opposite upper 50 and lower 52 surfaces. The longitudinal central plane is generally perpendicular to the flange lower surface 52. The body first portion 32 is integral with the flange lower surface 52. The flange lower surface 52 is adapted for mounting against the structure upper surface 26. The flange lower surface 52 is generally flat, but can be contoured to lie against a convoluted surface. Alternatively, the flange upper surface 50 can be adapted for mounting adjacent the structure upper surface 26 (not shown), resulting in a truly flush installation. This type of installation would be preferable in an aircraft to reduce air resistance. The flange 48 has an entrance hole 54 and an exit hole 56 spaced apart on the flange upper surface 50 and extending through the flange 48. The entrance hole 54 communicates with the entrance leg 38. The exit hole 56 communicates with the exit leg 40. The entrance hole 54 is larger than the exit hole 56. The entrance 54 and exit 56 holes are adapted to pass the rope 22 into the entrance hole 54, through the U-shaped cavity 36, and out the exit hole 56.

The entrance hole 54 is larger than the exit hole 56, and significantly larger than the rope 22. This is to facilitate easy insertion of the rope 22 into the entrance hole 54 and the entrance leg 38. The exit hole 56 is only slightly larger than the rope 22; so as to pass the rope, yet hold the rope securely.

The cleat 20 has registration pins 58 on one of the body first 32 and second 34 portions. The cleat 20 has corresponding registration holes 60 on the opposite portion, either the body second 34 or first 32 portion, respectively. The registration holes 60 are adapted to receive the registration pins 58, so as to align the body first 32 and second 34 portions.

A flathead machine screw 62 fastens the body first 32 and second 34 portions together. Suitable threaded fasteners 64 attach the flange 48 to the structure 24. Alternatively, the flange can be welded or cemented in place.

In use, the rope 22 will be inserted into the entrance hole 54, and is guided through the U-shaped cavity 36 by virtue of the tapered entrance leg 38: The rope 22 emerges from the exit hole 56, and a knot 66 is tied to secure the rope 22 in the cleat 20. Any knot 66 will work, although a slipknot is easiest to remove. Thus, no special knowledge of knots is necessary to use the invention. The flange 48 lies low against the structure 24, to prevent tripping or fouling equipment.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications that will come within the scope of the appended claims is reserved.

PARTS LIST

FLUSH CLEAT

Part
No. Description
20 flush cleat
22 rope
24 structure
26 structure upper surface
28 mounting hole
30 body
32 body first portion
34 body second portion
36 U-shaped cavity
38 cavity entrance leg.
40 cavity exit leg
42 cavity confluent portion
44 cavity first half
46 cavity second half
48 flange
50 flange upper surface
52 flange lower surface
54 flange entrance hole
56 flange exit hole
58 registration pins
60 registration holes
62 machine screw
64 threaded fasteners
66 knot The embodiments of the invention in which an exclusive property or privilege is claimed are defined as follows:

1. A cleat, for use in connection with a structure and a rope, the structure having an upper surface and a mounting hole through the upper surface, the cleat comprising:
   - a body having a U-shaped cavity therein, the U-shaped cavity having an entrance leg, an exit leg, and a confluent portion where the entrance leg and the exit leg communicate, the entrance leg being larger than the exit leg, the U-shaped cavity being tapered between the entrance leg and the exit leg, the body being adapted for insertion into the mounting hole; and
   - a flange attached to the body, the flange having opposite upper and lower surfaces, the flange being adapted for mounting against the structure, the flange having an entrance hole and an exit hole spaced apart on the flange upper surface and extending through the flange, the entrance hole being larger than the exit hole, the entrance and exit holes communicating with the U-shaped cavity, the entrance and exit holes being adapted to pass the rope into the entrance hole, through the U-shaped cavity, and out the exit hole.

2. The cleat of claim 1, wherein:
   the body further comprises opposite first and second portions, the first and second portions being joined along a longitudinal central plane generally perpendicular to the flange lower surface, the body first portion being integral with the flange lower surface; and
   the U-shaped cavity further comprises a U-shaped central axis, the central axis lying in the central plane, the U-shaped cavity having a first half lying in the body first portion, and a second half lying in the body second portion.

3. The cleat of claim 2, further comprising:
   registration pins on one of the body first and second portions, and corresponding registration holes on the opposite portion, the registration holes being adapted to receive the registration pins; and
   the flange lower surface being generally flat.

4. A cleat, for use in connection with a structure and a rope, the structure, having an upper surface and a mounting hole through the upper surface, the cleat comprising:
   - a body having opposite first and second portions, the first and second portions being joined along a longitudinal central plane, the body having a U-shaped cavity therein with a U-shaped central axis, the central axis lying in the central plane, the U-shaped cavity having an entrance leg with an entrance cross-sectional area, the U-shaped cavity having an exit leg with an exit cross-sectional area, the U-shaped cavity having a confluent portion where the entrance leg and the exit leg communicate, the entrance leg cross-sectional area being larger than the exit leg cross-sectional area, whereby the U-shaped cavity is tapered between the entrance leg and the exit leg, the U-shaped cavity having a first half lying in the body first portion, and a second half lying in the body second portion, the body being adapted for insertion into the mounting hole; and
   - a flange attached to the body, the flange having opposite upper and lower surfaces, the body first portion being integral with the flange lower surface, the flange being adapted for mounting against the structure, the flange having an entrance hole and an exit hole spaced apart on the flange upper surface and extending through the flange, the entrance hole communicating with the entrance leg, the exit hole communicating with the exit leg, the entrance hole being larger than the exit hole, the entrance and exit holes being adapted to pass the rope into the entrance hole, through the U-shaped cavity, and out the exit hole.

5. The cleat of claim 4, further comprising:
   registration pins on one of the body first and second portions, and corresponding registration holes on the opposite portion, the registration holes being adapted to receive the registration pins; and
   the flange lower surface being generally flat.

* * * * *